(12) United States Patent
Bekas et al.

(10) Patent No.: US 9,262,380 B2
(45) Date of Patent: Feb. 16, 2016

(54) CALCULATING NODE CENTRALITIES IN LARGE NETWORKS AND GRAPHS

(71) Applicant: International Business Machines Corporation, Armonk, NY (US)

(72) Inventors: Konstantinos Bekas, Rueschlikon (CH); Alessandro Curioni, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 13/900,040

(22) Filed: May 22, 2013

(65) Prior Publication Data

US 2014/0351307 A1    Nov. 27, 2014

(51) Int. Cl.
G06F 1/02        (2006.01)
G06F 7/32        (2006.01)
G06F 17/16       (2006.01)
G06F 7/556       (2006.01)
G06F 17/10       (2006.01)
G06F 17/30       (2006.01)

(52) U.S. Cl.
CPC ............... *G06F 17/16* (2013.01); *G06F 7/556* (2013.01); *G06F 17/10* (2013.01); *G06F 17/30587* (2013.01); *G06F 17/30958* (2013.01)

(58) Field of Classification Search
CPC ......... G06F 17/16; G06F 17/10; G06F 7/556; G06F 17/30587; G06F 17/30958
USPC ........................ 708/514, 520, 277
See application file for complete search history.

(56) References Cited

U.S. PATENT DOCUMENTS

| 2012/0005247 | A1   | 1/2012  | Bekas et al. |         |
|--------------|------|---------|--------------|---------|
| 2014/0351289 | A1 * | 11/2014 | Bekas et al. | 707/798 |
| 2014/0351290 | A1 * | 11/2014 | Bekas et al. | 707/798 |
| 2014/0351564 | A1 * | 11/2014 | Bekas et al. | 712/222 |

OTHER PUBLICATIONS

"Analysis of some Krylov Subspace Approximations to the Matrix Exponential Operator", Y. Saad, 1992.*
Bekas et al., "An Estimator for the Diagonal of a Matrix", Applied Numerical Mathematics, vol. 57, Issue 11-12, Nov. 2007, pp. 1-21.
Estrada et al., "Network Properties Revealed Through Matrix Functions", SIAM Review 52, 2010, pp. 1-22.
Estrada et al., "Subgraph Centrality in Complex Networks", Phys. Rev. E. 71, 2005, pp. 1-29.
Saad, "Iterative Methods for Sparse Linear Systems, Second Edition", Society for Industrial and Applied Mathematics, 2003, pp. 1-567.
Karypis et al., "Parallel Multilevel Graph Partitioning", 10th Intl. Parallel Processing Symposium, 1996, pp. 314-319.

* cited by examiner

*Primary Examiner* — Tan V. Mai
(74) *Attorney, Agent, or Firm* — Cantor Colburn LLP; Daniel Morris

(57) ABSTRACT

Embodiments related to calculating node centralities in large and complex networks and graphs. An aspect includes approximating a product of a matrix exponential and a random probe vector of an adjacency matrix, wherein the adjacency matrix represents a graph. A diagonal of the adjacency matrix is computed based on the product of the matrix exponential and the random probe vector. The node centralities are then calculated based on the computed diagonal until a designated number of central nodes has been detected according to embodiments.

6 Claims, 4 Drawing Sheets ns US 9,262,380 B2

CALCULATING NODE CENTRALITIES IN LARGE NETWORKS AND GRAPHS

BACKGROUND

The present invention relates generally to graph theory, and more specifically, to calculating node centralities in large and complex networks and graphs.

Graph theory is the study of graphs, which are mathematical structures used to model pairwise relations between objects. A graph in this context is made up of vertices or nodes and lines called edges that connect them. Graphs are widely used in applications to model many types of relations and process dynamics in physical, biological, social and information systems. Accordingly, many practical problems in modern technological, scientific and business applications are typically represented by graphs.

The centrality of a node is a widely used measure to determine the relative importance a node within a full network or graph. Node centralities may be used to determine which nodes are important in a complex network, to understand influencers, or to find hot spot links For example, node centralities are typically used to determine how influential a person is within a social network, or, in the theory of space syntax, how important a room is within a building or how well-used a road is within an urban network.

BRIEF SUMMARY

According to an embodiment of the present invention, a method for calculating node centralities in large and complex networks and graphs is provided. The method includes approximating a product of a matrix exponential and a random probe vector of an adjacency matrix, wherein the adjacency matrix represents a graph. A diagonal of the adjacency matrix is computed based on the product of the matrix exponential and the random probe vector. The node centralities are then calculated based on the computed diagonal until a designated number of central nodes has been detected.

According to another embodiment of the present invention, a system for calculating node centralities in large and complex networks and graphs is provided. The system includes a computer processor and logic executable by the computer processor. The logic is configured to implement a method. The method includes approximating a product of a matrix exponential and a random probe vector of an adjacency matrix, wherein the adjacency matrix represents a graph. A diagonal of the adjacency matrix is computed based on the product of the matrix exponential and the random probe vector. The node centralities are then calculated based on the computed diagonal until a designated number of central nodes has been detected.

According to a further embodiment of the present invention, a computer program product for calculating node centralities in large and complex networks and graphs is provided. The computer program product includes a storage medium having computer-readable program code embodied thereon, which when executed by a computer processor, causes the computer processor to implement a method. The method includes approximating a product of a matrix exponential and a random probe vector of an adjacency matrix, wherein the adjacency matrix represents a graph. A diagonal of the adjacency matrix is computed based on the product of the matrix exponential and the random probe vector. The node centralities are then calculated based on the computed diagonal until a designated number of central nodes has been detected.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
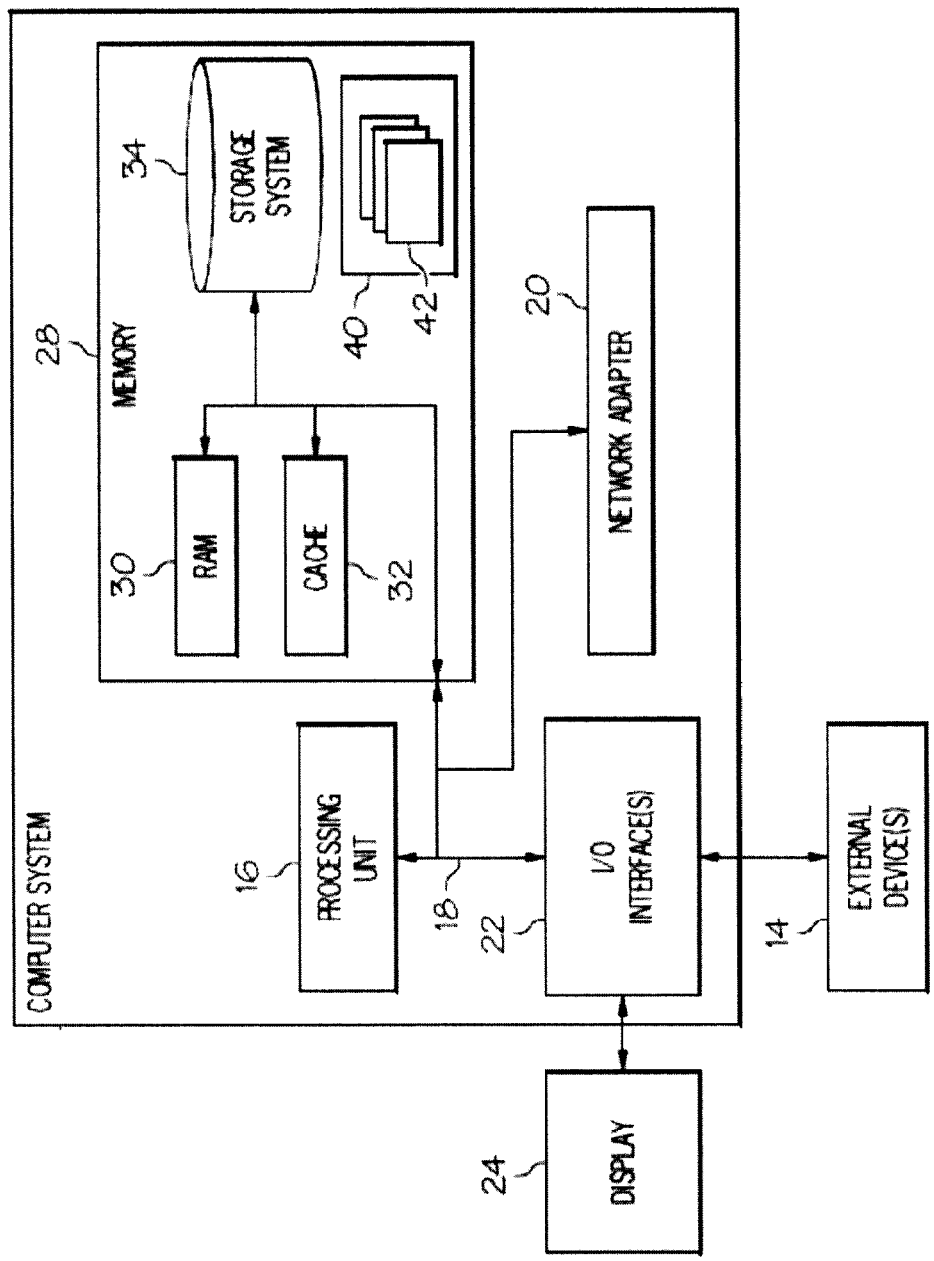
FIG. 1 depicts a block diagram of a computer system according to an embodiment.

Embodiments disclosed herein are directed to calculating node centralities in large and complex networks and graphs. Aspects of embodiments include approximating a product of a matrix exponential and a random probe vector of an adjacency matrix, wherein the adjacency matrix represents a graph. A diagonal of the adjacency matrix is computed based on the product of the matrix exponential and the random probe vector. The node centralities are then calculated based on the computed diagonal until a designated number of central nodes has been detected according to embodiments.

There typically exists a very high cost for computing node centralities. One example of a method for computing node centralities involves the matrix exponential. Consider the adjacency matrix A of an undirected graph (e.g., network). That is, the (i,j) element of matrix A is non-zero only if node i and node j are adjacent. Typically, this non-zero value is set to either 1 or to a certain weight according to some user specified weighting scheme. Consider the matrix exponential $E=\exp(A)=I+A+A2/2!+A3/3!+A4/4!+\ldots$. The diagonal element $E(i,i)$ of the matrix exponential is then the node centrality of node i.

Accordingly, a calculation of the node centralities is accomplished by: (i) calculating the spectral decomposition of the adjacency matrix A: $A=QDQ^T$, where D is a diagonal matrix, Q is the matrix of orthogonal eigenvectors, and $Q^T$ stands for the transpose of this matrix (i.e., every element (i,j) of Q becomes element (j,i) of its transpose), (ii) calculating the matrix exponential $\exp(D)$, which amounts to calculating the scalar exponentials $\exp(D(i,i))$, $i=1,\ldots N$, where N is the size of the matrix (i.e., the number of nodes in the graph), and (iii) computing the diagonal entries of the matrix product $E=Q \exp(D)Q^T$.

An alternative of method for calculating node centralities replaces the matrix exponential with a resolvent function $(A-zI)^{-1}$, where I is the identity matrix and z is a suitably selected scalar number. This calculation is accomplished by: (i) computing the Cholesky decomposition of matrix $(A-zI)$: $A-zI=R^TR$, (ii) solving the linear systems $(R^{-1}R)z_i=e_i$, i=1, ..., N, where the vectors $e_i$ have 1 at the i-th element and zero elsewhere, and (iii) computing the diagonal entries as $d_i = e_i^T z_i$.

The methods discussed above are simple, elegant and can use standard linear algebra packages such as Linear Algebra Package (LAPACK). However, the major caveat is their cost that increases as the cube of the number of nodes of the graph. That is, computing the node centralities of a graph (e.g., network) with 10,000 nodes already requires 1 tera floating point operations per second (FLOP) of computations, while interesting graphs can easily reach sizes of tens of millions of nodes. A graph with 50 million nodes would require at least 125 zeta FLOP of computations ($125 \times 10^{21}$). This would take the most powerful contemporary supercomputer more than 90 days of computations.

Alternative conventional methods for computing node centralities in large networks and graphs may sample the nodes of the graph in an attempt to reduce the number of the nodes and thus the computational complexity. These methods, however, generate huge biases and offer very limited ways of regulating and understanding the error.

Embodiments disclosed herein identify only the most central nodes of a large and complex graph. In other words, embodiments quickly home in on the most important (i.e., central) nodes to drastically reduce cost and memory footprint of calculating node centralities of a large and complex graph. The disclosed embodiments combine a stochastic estimator for the diagonal of a matrix with methods for approximating the product of a matrix exponential times a vector and mixed precision low complexity methods to solve linear systems of equations. Accordingly, embodiments may exploit the stochastic nature of a stochastic estimator for the diagonal of a matrix and can stop at any point during the iteration when a user specified number of central nodes has been detected.

Referring now to FIG. 1, a block diagram of a computer system 10 suitable for calculating node centralities in large and complex networks and graphs according to exemplary embodiments is shown. Computer system 10 is only one example of a computer system and is not intended to suggest any limitation as to the scope of use or functionality of embodiments described herein. Regardless, computer system 10 is capable of being implemented and/or performing any of the functionality set forth hereinabove.

Computer system 10 is operational with numerous other general purpose or special purpose computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a general-purpose computing device, also referred to as a processing device. The components of computer system may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 28 can include computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, and data archival storage systems, etc.

An embodiment combines a stochastic estimator for the diagonal of a matrix with methods to approximate the product of a matrix exponential times a vector and mixed precision low complexity methods to solve linear systems of equations.

The stochastic diagonal estimator of an embodiment uses the formula $D_s = \text{SUM}_1^s (v_i \cdot x F(A)v_i)./\text{SUM}_1^s (v_i \cdot x v_i)$, where D is a diagonal, $v_i$ is a selected vector, s is the total number of required vectors, A is the adjacency matrix, F(A) is the matrix exponential, and .x and ./ symbolize element-wise multiplication and division, respectively. Element-wise multiplication for two vectors x, y is a process that includes setting a variable u=1, calculating a result res(u)=x(u)*y(u), and increasing a counter u=u+1 until u<=n, where n is the size (i.e., length) of the vectors x, y, and res. In this particular case, n is the number of nodes of the graph. Similarly, element-wise division and addition of two vectors x, y is processed simply by substituting the calculation of res(u) described above with res(u)=x(u)/y(u) and res(u)=x(u)+y(u), respectively.

The stochastic diagonal estimator of an embodiment requires access to approximations of the products $F(A)v_i$ for carefully selected vectors $v_i$. According to an embodiment, the total number of required vectors s is set to be much smaller than the size N of the adjacency matrix. An embodiment for approximating the matrix vector product $F(A)v_i$ requires a small number k of matrix vector products with the adjacency matrix A itself (i.e., k<<N). Thus, since the adjacency matrices of graphs are typically quite sparse by definition, this means that each matrix-vector product with the adjacency matrix costs O(N). Therefore, the total cost of an embodiment is: O(Nks). The numbers k and s are selected to be at most a few hundred according to an embodiment. Thus, the graph with 50 million nodes would now require only 12.5 terra FLOP ($12.5 \times 10^{12}$), which is approximately 8 orders of magnitude less than contemporary methods. Accordingly, it would take about $\frac{1}{100}^{th}$ of a second to calculate node centralities on the best contemporary supercomputer.

Figure 2:
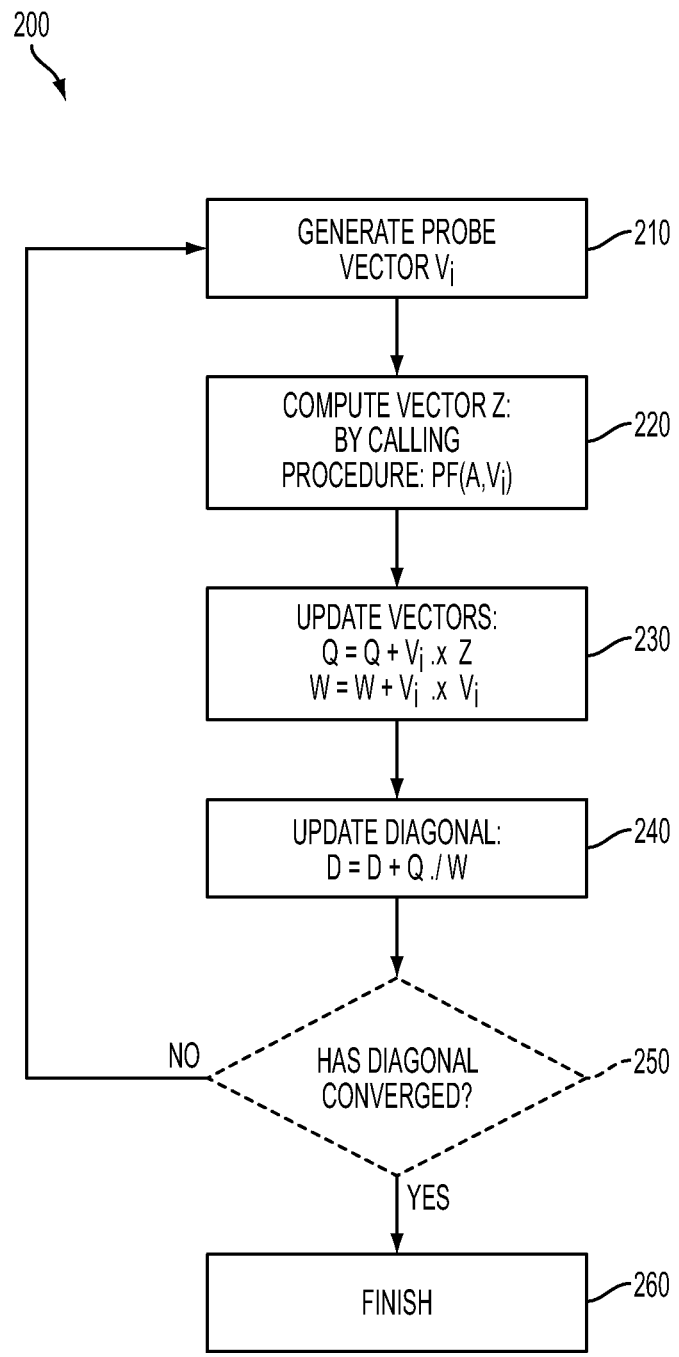
FIG. 2 depicts a flow diagram of a process for calculating the most important nodes in large and complex networks and graphs according to an embodiment.

With reference to FIG. 2, a process 200 performed by an embodiment of the processing device 16 of computer system 10 is generally shown. As shown in FIG. 2, the process 200 calculates the most important (i.e., central) nodes in large and complex networks and graphs according to an embodiment.

Process 200 may receive the following data as input: graph G and its adjacency matrix A of size N, user tolerances tol_diagonal and tol_function, maximum number of steps s (i.e., a maximum required number of vectors) and k (i.e., a maximum number of Lanczos steps), and a required percentage of nodes with highest centrality. The user tolerances tol_diagonal and tol_function are user defined and may change with regard to particular applications. Based on these input values, the process 200 will output estimated node centralities for graph G.

According to an embodiment, vectors Q, W, D of length N are initialized to zero. At block 210, a random probe vector $v_i$ is generated. Vector Z is then computed (i.e., $Z:=F(A)v_i$) by calling a process PF (i.e., $PF(A, v_i)$) of an embodiment to approximate the product of the matrix exponential F(A) and the random probe vector $v_i$, as shown in block 220. One embodiment of process PF is described in further detail below with respect to FIG. 3.

At block 230, vectors Q and W are updated according to an embodiment. Vector Q is updated by calculating $Q = Q + v_i \cdot x Z$. Vector W is updated by calculating $W = W + v_i \cdot x v_i$. The diagonal of adjacency matrix A is then updated according to an embodiment, as shown in block 240. Vector D is updated by calculating D=D+Q./W.

At block 250, an embodiment of the process 200 determines whether a designated end condition has been reached. Responsive to an end condition at block 250, the process 200 is completed, as shown in block 260. However, if an end condition has not been reached at block 250, the process 200 restarts at block 210 and generates another random probe vector $v_i$. According to an embodiment, a designated end condition may include a condition where the difference of a previously estimated diagonal and the estimated diagonal is smaller than tol_diagonal, a condition where the maximum number of steps s has been reached, or a condition where the percentage of nodes with highest centrality has converged. According to an embodiment, responsive to the condition where the maximum number of steps s has been reached, the process 200 may consider increasing the number of maximum number of steps s prior to restarting at block 210.

Figure 3:
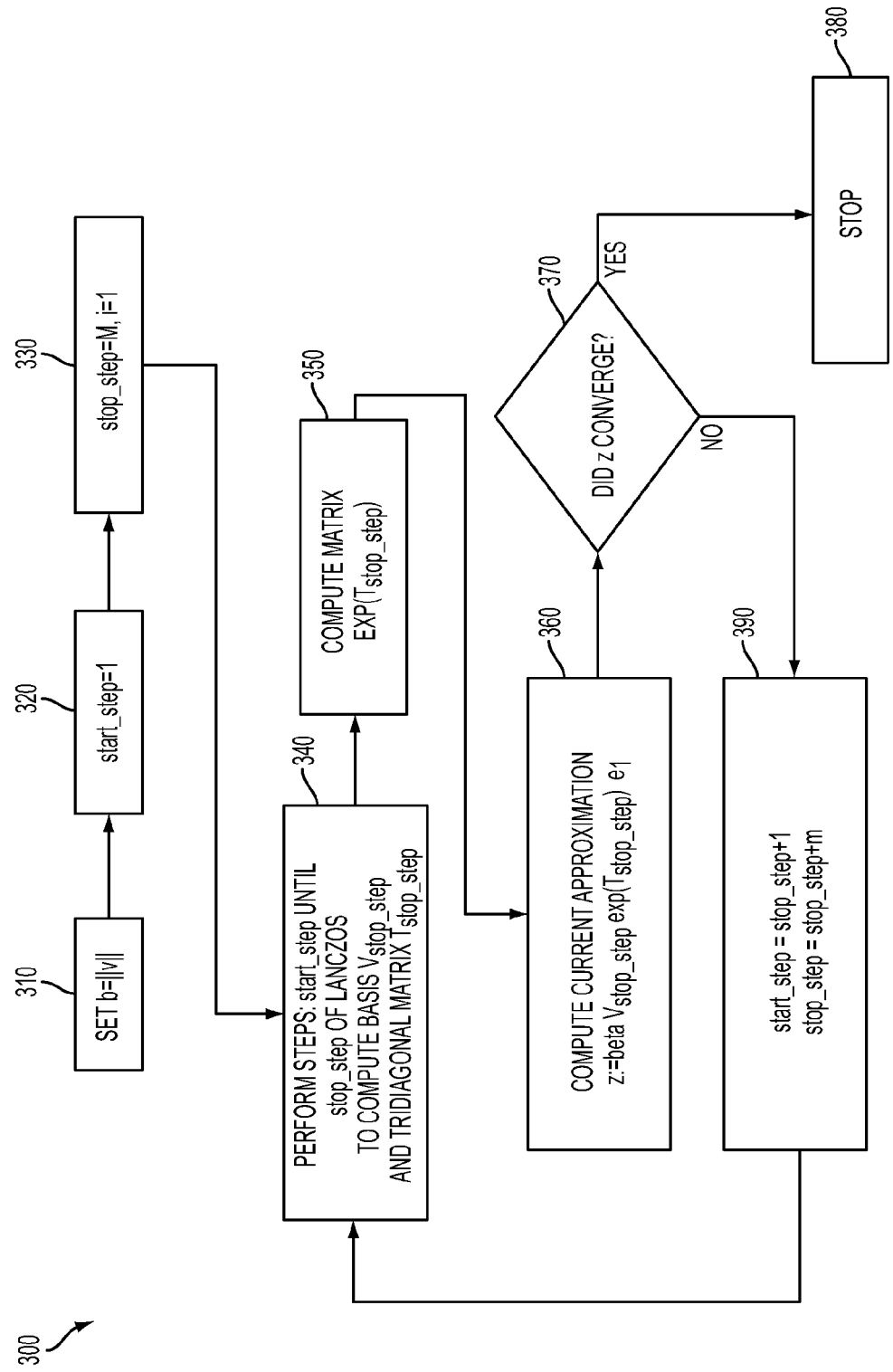
FIG. 3 depicts a PF process for approximating the product of the matrix exponential and the random probe vector according to an embodiment.

With reference to FIG. 3, an embodiment of a PF process 300 for approximating the product of the matrix exponential F(A) and the random probe vector $v_i$ according to an embodiment is shown. Process 300 may receive the following data as input: adjacency matrix A of size N, input vector $v_i$, maximum number of steps k, user tolerance tol_function, $e_1$, which is the vector of length N with 1 as its first position and zero elsewhere, and a chunk size m<k. The process 300 of an embodiment outputs an approximation to vector $Z:=F(A)v_i$.

At block 310, beta b is set to be the Euclidean norm of vector $v_i$ according to an embodiment. A start_step variable is initially set to 1, as shown in block 320, and a stop_step variable is set to m, where i=1, as shown in block 330. At block 340, a Lanczos method of an embodiment is performed from start_step until stop_step to compute an orthogonal Krylov basis Vstop_step and tridiagonal matrix Tstop_step. According to an embodiment, matrix Vstop_step has size N rows and i*m columns and Matrix Tstop_step has i*m rows and columns. The Lanczos method of an embodiment is described in further detail in FIG. 4 below.

At block 350, a matrix exponential of tridiagonal matrix Tstop_step (i.e., exp(Tstop_step) is computed according to an embodiment. At block 360, a current approximation Z:=beta $V_{stop\_step}$ ex($T_{stop\_step}$) $e_1$ is computed according to an embodiment. At block 370, an embodiment determines whether vector Z has converged (i.e., current approximation of Z and the previous approximation Z differ in norm in less than user tolerance tol_function). If it is determined that Z has converged at block 370, then the process 300 stops, as shown in block 380.

If, however, it is determined that Z has not yet converged at block 370, then the start_step is then incremented to stop_step+1 and the stop_step is then incremented to stop_step+m, as shown in block 390. If the maximum number of steps k has not been exceeded (i.e., i*m>k) then the process 300 is restarted at block 340. Otherwise, if the maximum number of steps k has been exceeded, the process 300 stops according to an embodiment.

Figure 4:
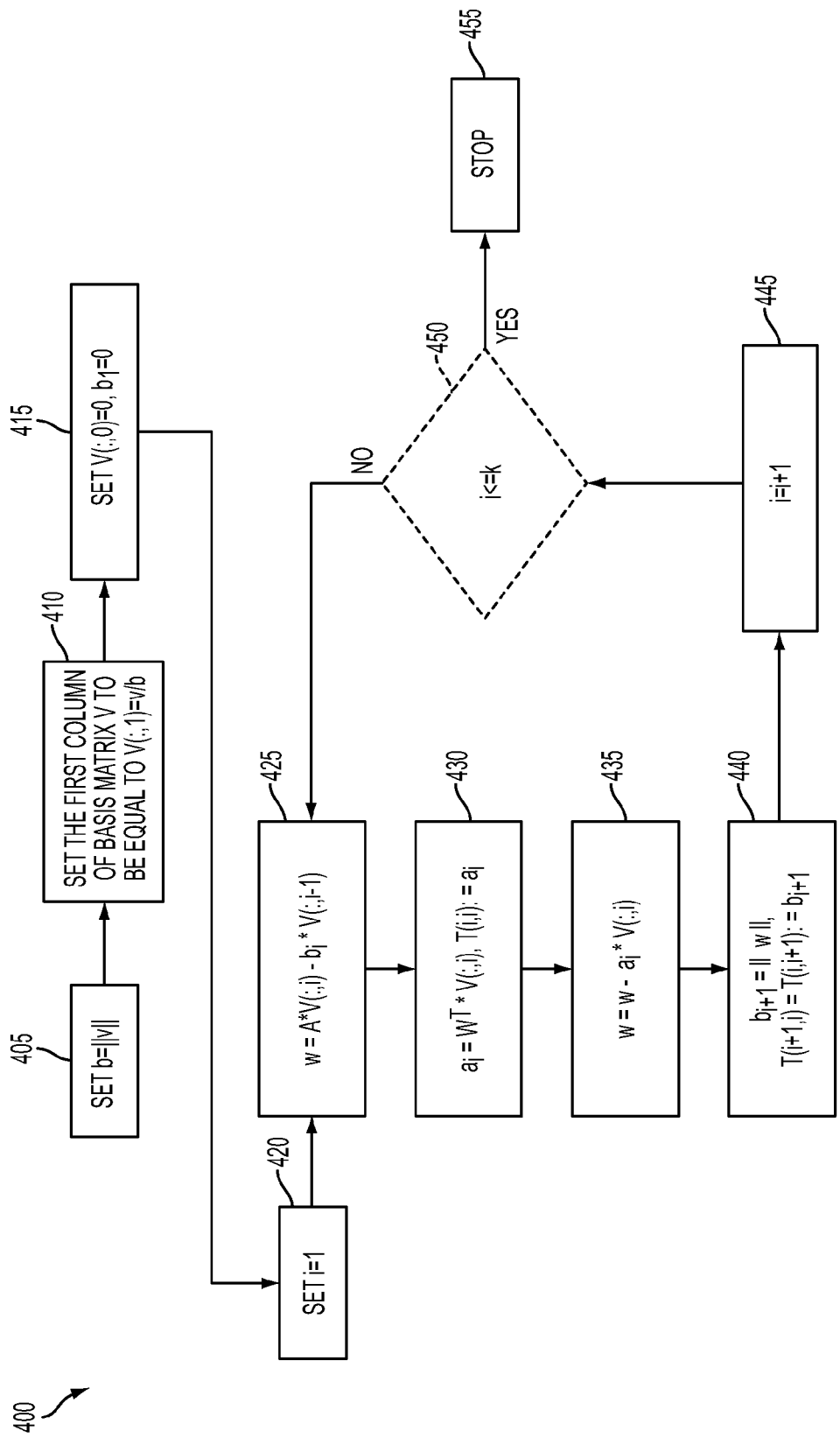
FIG. 4 depicts a Lanczos process for calculating a Krylov basis and a tridiagonal matrix according to an embodiment.

With reference to FIG. 4, a Lanczos process 400 for calculating a Krylov basis and a tridiagonal matrix according to an embodiment is shown. Process 400 may receive the following data as input: adjacency matrix A of size N, input vector V and maximum number of steps k (i.e., a maximum number of Lanczos steps). The process 400 of an embodiment outputs a Krylov basis V and a tridiagonal matrix T. According to this embodiment, W is a vector of length n and $a_i$ and $b_i$ are scalar values.

At block 405, beta b is set to be the Euclidean norm of input vector v according to an embodiment. The first column of basis matrix V is initialized to V(:,1)=v/b, as shown in block 410. At block 415, V(:,0) is set to 0, $b_1$ is set to 0 and, at block 420, variable i is initially set to 1.

At block 420, W is computed using the formula $A*V(:,i)-b_i*V(:,i-1)$ according to an embodiment. According to an embodiment, the matrix vector multiplication in this formula is implemented by setting a variable i=1, j=1, res(i)=0, computing res(i)=res(i)+A(i,j)*x(j), and incrementing j. If j is less than or equal to n, then res(i)=res(i)+A(i,j)*x(j) is recomputed and j is incremented again. If j is greater than n, then i is incremented. If i greater than n, then the multiplication of the vector stops. However, if i is less than or equal to n, then res(i) is reset to 0, res(i)=res(i)+A(i,j)*x(j) is recomputed and j is incremented again.

At block 425, $a_i$ is computed using the formula $w^T*V(:,i)$, where T(i,i):=$a_i$. W is then computed using the formula $W-a_i*V(:,i)$, as shown in block 430. At block 435, $b_{i+1}$ is set to equal ||w|| and T(i+1,i)=T(i, i+1):=$b_i$+1. At block 440, i is incremented. If i is less than or equal to k at block 445, then the process 400 is stopped, as shown in block 450. If i is greater than k, then the process 400 is restarted at block 420. Accordingly, the symmetric tridiagonal matrix T is given as main diagonal: [a1 a2 a3 . . . ] and the super and sub-diagonal [b2 b3 b4 . . . ].

According to an alternative embodiment, the PF process of block 220 for approximating vector Z may be calculated using a resolvent function (i.e., $(A-zI)^{-1}v_i$), where I is the identity matrix and z is a suitably selected scalar number. According to this embodiment, the PF process may receive the following data as input: adjacency matrix A of size N, input vector $v_i$, maximum number of steps k, and user tolerance tol_function. The process of this embodiment outputs an approximation to vector Z. The process for calculating Z:= $(A-zI)^{-1}v_i$), using k number of steps for the internal conjugate gradient method and user tolerance tol_function, is disclosed in U.S. Patent Application Publication No. 20120005247, titled "Processing of Linear Systems of Equations" and filed on Aug. 18, 2011, the entire contents of which are hereby incorporated by reference.

Embodiments disclosed herein are directed to calculating node centralities in large and complex networks and graphs. Aspects of embodiments include approximating a product of a matrix exponential and a random probe vector of an adjacency matrix, wherein the adjacency matrix represents a graph. A diagonal of the adjacency matrix is computed based on the product of the matrix exponential and the random probe vector. The node centralities are then calculated based on the computed diagonal until a designated number of central nodes has been detected according to embodiments.

Technical effects and benefits include an extremely reduced cost because geometric and connectivity information within the original graph is preserved in the remaining central nodes. Embodiments reduce memory footprint and traffic to memory. Conventional methods need to compute the eigenvector matrix Q. In contrast to the adjacency matrix A which is sparse, matrix Q is dense. Thus, memory requirements run at $O(N^2)$. The memory requirements of the disclosed embodiments remain O(N). In addition, only a few vectors need to remain in the cache system, thus traffic to the memory subsystem is kept to O(N) words, while conventional methods need at least $O(N^2)$ words. Additionally, it is very often the case that only a few nodes of the graph are interesting with respect to having a high centrality. The disclosed embodiments exploit its stochastic nature and can stop at any point during the iteration when a user specified number of central nodes has been detected. The conventional method, on the other hand, needs to pay the full cost before any results are available. Moreover, the disclosed embodiments are based on matrix vector products. This means that the only operation necessary is the application of the adjacency matrix on a vector. This can easily be accomplished on distributed data. That means, there is not a need to assemble the adjacency matrix, but rather, embodiments may work directly with the raw data collections.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method, comprising:
identifying one or more influences within a network, the identifying comprising:
representing the network as a graph comprising a plurality of nodes, the graph being further represented by an adjacency matrix;
multiplying a random probe vector $v_i$ by a resolvent function $(A-zI)^{-1}$, wherein A is the adjacency matrix, I is an identity matrix, and z is a selected scalar number
using a result of the multiplying the random probe vector by the resolvent function as an approximation of a product of a matrix exponential and the random probe vector;
computing, by a computer processor, a diagonal of the adjacency matrix based on the product of the matrix exponential and the random probe vector, wherein the computing comprises:
initializing vectors Q, W, and D of length N to zero, wherein the vector D represents the diagonal;
initializing the random probe vector $v_i$;
computing the product of the matrix and the random probe vector;
updating the vector Q by calculating $Q=Q+v_i.\times Z$, where Z is the product of the matrix and the random probe vector, wherein .x symbolizes element-wise multiplication;
updating the vector W by calculating $W=W+v_i.\times v_i$;
updating the vector D by calculating $D=D+Q./W$, wherein ./ symbolizes element-wise division; and
repeating the initializing the random probe vector, the computing the product, the updating the vector Q, the updating the vector W, and the updating the vector D until at least one of (a) the difference of a previously estimated diagonal and an estimated diagonal is smaller than a designated diagonal tolerance, and (b) a percentage of nodes with target centrality has converged; and
calculating node centralities of the graph based on the computed diagonal of the adjacency matrix.

2. The computer-implemented method of claim 1, wherein the approximating of the product of the matrix and the random probe vector further comprises:
computing an orthogonal Krylov basis and tridiagonal matrix, based on the adjacency matrix, using a Lanczos algorithm;

computing a matrix exponential of the tridiagonal matrix; and computing a current approximation of the product of the matrix exponential and the random probe vector.

3. The method of claims 1, wherein the network is a social network, wherein identifying the one or more influencers within the network comprises identifying one or more influential people in the social network, and the method further comprising:

selecting one or more central nodes of the graph, based on the node centralities, representing the one or more influential people in the social network.

4. A computer program product comprising a non-transitory computer readable storage medium having program instructions embodied therewith, the program instructions executable by a processor to cause the processor to perform a method comprising:

identifying one or more influences within a network, the identifying comprising:

representing the network as a graph comprising a plurality of nodes, the graph being further represented by an adjacency matrix;

multiplying a random probe vector $v_i$ by a resolvent function $(A-zI)^{-1}$, wherein A is the adjacency matrix, I is an identity matrix, and z is a selected scalar number;

using a result of the multiplying the random probe vector by the resolvent function as an approximation of a product of a matrix exponential and the random probe vector;

computing a diagonal of the adjacency matrix based on the product of the matrix exponential and the random probe vector, wherein the computing comprises:

initializing vectors Q, W, and D of length N to zero, wherein the vector D represents the diagonal;

initializing the random probe vector $v_i$;

computing the product of the matrix and the random probe vector;

updating the vector Q by calculating $Q=Q+v_i \, .x \, Z$, where Z is the product of the matrix and the random probe vector, wherein .x symbolizes element-wise multiplication;

updating the vector W by calculating $W=W+v_i \, .x \, v_i$;

updating the vector D by calculating $D=D+Q \, ./W$, wherein ./ symbolizes element-wise division; and repeating the initializing the random probe vector, the computing the product, the updating the vector Q, the updating the vector W, and the updating the vector D until at least one of (a) the difference of a previously estimated diagonal and an estimated diagonal is smaller than a designated diagonal tolerance, and (b) a percentage of nodes with target centrality has converged; and calculating node centralities of the graph based on the computed diagonal of the adjacency matrix.

5. The computer program product of claim 4, wherein the approximating of the product of the matrix and the random probe vector further comprises:

computing an orthogonal Krylov basis and tridiagonal matrix, based on the adjacency matrix, using a Lanczos algorithm;

computing a matrix exponential of the tridiagonal matrix; and computing a current approximation of the product of the matrix exponential and the random probe vector.

6. The computer program product of claim 4, wherein the network is a social network, wherein identifying the one or more influencers within the network comprises identifying one or more influential people in the social network, and the method further comprising:

selecting one or more central nodes of the graph, based on the node centralities, representing the one or more influential people in the social network.

\* \* \* \* \*